Patented Aug. 24, 1943

2,327,408

UNITED STATES PATENT OFFICE 2,327,408

FLOTATION

Edward J. Ellis, Bartow, Fla., assignor to Southern Phosphate Corporation, Baltimore, Md., a corporation of Delaware No Drawing. Application April 1, 1941,
Serial No. 386,309

3 Claims. (Cl. 209—166)

This invention is concerned with separation of minerals by flotation processes employing cationic reagents and aims to improve the selectivity of such processes, i. e. to accomplish a more thorough separation of the minerals present in the pulp subjected to flotation.

Cationic reagents are water-soluble organic compounds, such for example as salts of heavily loaded primary, secondary, tertiary or quaternary amines that yield large positive lipophile ions and mildly negative hydrophile ions in aqueous solution. Such compounds facilitate flotation of numerous minerals both metallic and non-metallic, but particularly quartz. Compounds of the cationic reagent type include octadecyl amine hydrochloride, hexadecyl amine hydrochloride, cetyl methyl amine hydrochloride, cetyl dimethyl amine hydrochloride, cetyl trimethyl amine hydrochloride, cetyl pyridinium bromide, octadecyl dimethyl phenyl ammonium chloride, and similar amine salts having a nitrogen atom derived from an $NH_4$ radical as a nucleus and with one or more of the hydrogen atoms replaced by organic groups. The nuclear nitrogen and the attached organic groups form in aqueous solution the large cation from which the group of reagents takes its name.

Although cationic reagents may be employed to facilitate the flotation of minerals of metallic lustre, including metallic sulfides such as galena, they find their major application in the flotation of quartz from non-sulfide minerals such as calcite, barite, fluorspar, iron oxide and rock phosphate. The application of cationic reagents to mineral separation, however, has been limited because the cationic reagents, in general, are insufficiently selective and in many cases do not bring about an adequate separation of the gangue from the more valuable mineral. Thus, a substantial proportion of the valuable mineral usually is floated off with quartz gangue in the tailing, while a substantial proportion of the quartz remains behind with the valuable mineral in the concentrate to the end that recovery and ratio of concentration of the valuable mineral are low. Improvements in recovery and ratio of concentration sometimes can be obtained through using larger proportions of the reagents, but the reagents are relatively expensive so that there is a distinct economic limit to improvements to be realized in this direction.

The selectivity of cationic reagents is greatly impaired and the consumption of such reagents greatly increased by the presence of even small proportions of slime or slimable material in the mineral pulp undergoing treatment, and it is not always feasible or economically practicable to remove slimes and slimable material to an extent that will permit cationic reagents to bring about a requisite degree of separation of the minerals in the pulp. The problem of accomplishing slime removal adequate to the economic application of cationic reagents is aggravated, in many ore dressing operations, by the lack of a sufficient supply of absolutely slime-free water. In many operations it is necessary to recover water from treated pulp (by means of thickeners or the like) and return the water to the flotation or other mineral separation treatment. Even the small proportion of slime present in the apparently clear water decanted from a thickener often is sufficient to have a marked deleterious effect upon selectivity and consumption of cationic reagents, if this water is returned to the flotation circuit. Consequently, even though considerable effort is made to deslime the pulp prior to adding the cationic reagents, and even though the pulp be subjected to agitation or "attrition" prior to desliming so as to remove "slimable" material as well as actual slimes, an irreducible proportion of slimes ordinarily will remain in the pulp and will interfere with separation by flotation and increase reagent consumption.

As a result of my investigations, I have discovered that the selectivity of flotation processes employing cationic reagents can be improved substantially (even when the pulp undergoing treatment contains substantial slimes or slimable material) by employing an "ionization inhibitor" to restrict the ionization of the cationic reagent present. The substance employed as an inhibitor may be added to the cationic reagent either before or after the incorporation of the reagent in the pulp, and may reduce the ionization of the reagent with or without affecting its water solubility. By the expression "ionization of the cationic reagent" as used herein and in the claims I intend to refer to the ionic concentration in the solution or pulp at a given time. Thus when reference is had to "reduced" or "restricted" ionization of the cationic reagent, it is intended that such a reference shall embrace conditions wherein the concentration of ions of the original catalytic reagent in the solution is diminished, whether the diminution is due to a common ion effect, the formation of a soluble complex ion having a lower ionization constant, the formation of a less soluble compound providing a decreased proportion of dissolved reagent capable of ionizing, or to any other cause.

Suitable ionization inhibitors for use in the practice of the invention may be classified as follows:

I. Compounds that react with the cationic reagents to form other cationic-active compounds of diminished water solubility and consequent diminished ionization. Examples of such compounds are:

A. Sulfuric acid, alkali sulfates, alkaline earth sulfates and other compounds yielding —$SO_4$ ions in aqueous solution;

B. Organic sulfonates;

C. Sodium thiosulfate and other compounds yielding —$S_2O_3$ ions in aqueous solution;

D. Sodium fluosilicate and other compounds yielding —$SiF_6$ ions in aqueous solution;

E. Chloroplatinic acid;

F. Compounds, such as potassium perchlorate, that yield —$ClO_4$ ions in aqueous solution;

G. Compounds, such as alkali and alkaline earth hydrates and ammonium—and alkylated ammonium hydrates, that yield —OH ions in aqueous solution; and H. Molybdic acid.

II. Compounds that restrict ionization of the cationic reagent without necessarily affecting its water-solubility:

A. Compounds which react with the cationic reagent to form compounds that are no less water-soluble, but that ionize to a lesser extent, for example:

1. Metal-ammonium complexes such as cupro-ammonium nitrate and zinc-ammonium nitrate;

2. Ferrocyanides, such as potassium ferrocyanide;

B. Water-miscible (i. e., water-soluble or water-dispersable) non-electrolytes that limit ionization of cationic reagents without apparent chemical union, for example, carbohydrates such as sugars, dextrines and starches in the form of hydrous jellies.

As indicated above, the ionization inhibitor may be with the cationic reagent either before or after its incorporation in the pulp. In some instances, especially when the reagent is of type I and reacts to produce a cationic reagent of diminished solubility, it is desirable to carry on the reaction prior to incorporation in the pulp.

Cationic reagents are, in general, active in both acid and alkaline pulps—although some of the reagents that are positively charged in acid solution acquire a negative charge in alkaline solution and vice-versa. Consequently, in the practice of the invention, the pH of the pulp should be such that the cationic-activity of the reagent is preserved, and in general the pH of the pulp should be that which is most suitable in the particular flotation operation—minus the ionization inhibitor. In other words, the inhibitor should be employed without materially altering the pH of the pulp. Many of the reagents are substantially neutral in character and can be employed in relatively large proportion without affecting the pH of the pulp. Others, for example, sulphuric acid and alkali metal hydrates, are strong acids and bases, and would have a pronounced effect upon hydrogen ion concentration if large proportions were required to inhibit ionization. However, these inhibitors are of such nature that only a small proportion of them is required—a proportion which is so small, in terms of the quantity of pulp, that they may be employed without substantially changing the pH of the pulp.

If the inhibitor employed is strongly acid or alkaline and is of the type which reacts with the cationic reagent to reduce its solubility, it may be desirable to carry on the reaction between the two prior to introducing them into the pulp, so that there is an opportunity to remove the excess inhibitor. Thus, if sulphuric acid is employed to react with a quaternary ammonium compound to produce a modified compound that is sparingly soluble in water, it may be desirable to react the two to form a precipitate of the modified compound which is introduced into the pulp after it has been washed to free it of excess acid.

To summarize, my invention contemplates the improvement in mineral separation involving the flotation of one mineral away from another in an aqueous pulp in the presence of a cationic reagent which comprises restricting the ionization of the reagent, i. e., preventing the reagent from ionization to the extent possible at the prevailing pH of the pulp, by means of an ionization inhibitor. This ionization inhibitor is of such nature and is employed in such proportions that it has substantially no effect upon the pH of the pulp. The invention is particularly useful in the flotation of quartz from phosphate in a substantially neutral pulp, in the presence of heavily loaded quaternary ammonium salts, but may also be employed to further the flotation of other minerals with other cationic flotation reagents. Thus it may be employed to overcome the deleterious effect of slime, by which I mean slimable material as well as free slime, in the separation of a variety of minerals by froth flotation in the presence of a cationic reagent.

Hereinafter the practice and advantages of my invention are illustrated with reference to the flotation of quartz from Florida rock phosphate, in a substantially neutral pulp, but it will be understood that the invention may also be applied in the flotation of quartz from other minerals, for example, calcite, barite, fluospar and iron oxides as well as to the flotation of other minerals, including sulphides such as galena. In short, the invention may be applied with advantage to any mineral flotation operation that employs a cationic reagent. It should be understood, also, that the invention may be practiced with substantially all cationic reagents and in pulps of different hydrogen ion concentrations.

In all of the following examples the feed, i. e., the mineral aggregate treated, was Florida rock phosphate from which coarse high-grade phosphate pebbles and considerable slime had been removed in a washery. Such material is known as "debris" or "recovery plant feed," depending upon whether it is discarded or subjected to further phosphate recovery operations and consists essentially of silica and phosphate sand together with a small proportion of "free" slime and a larger proportion of "slimable" material, i. e., soft friable material attached to the larger particles of silica and phosphate.

Conventional desliming treatment will remove the free slime from such feed, but the slimable material is not removed by washing, etc., unless the feed pulp is given a preliminary agitation or "attrition" treatment calculated to free the "slimable" material from the larger and harder particles. In most instances the feed was subjected to such an attrition treatment followed by washing with clear water before any flotation reagents were added. Other factors remaining the same, the longer the attrition treatment, the more thorough the removal of slimable material, so the duration of the attrition treatment is an index of the freedom of the washed feed with respect to actual and potential slimes. In some instances, the effect of slime upon the process was determined by returning to the feed a portion of the slime removed.

The cationic reagent employed in all of the examples was a mixture of hexadecal and octadecyl ammonium chlorides sold under the name "AMCL–1180–B" by Armour and Company, but referred to hereinafter as "Cl—B" in the interest of brevity. The "collector" employed in all cases was light gravity petroleum fuel oil, and the "frother" was du Pont's "B—23." The proportions of these and other reagents are given in the following tables in pounds per dry ton of feed.

In all instances the density of the deslimed pulp was adjusted to a predetermined point by addition of water. The pulp was then conditioned by agitation in the presence of the cationic reagent, the ionization inhibitor (if one was employed) and the collector, or conditioner in the presence of the collector and of the cationic reagent subsequent to treatment thereof to restore its ionization. Thereafter the frother was added and the pulp was diluted with water. During subsequent froth flotation, the silica was removed from the pulp as a dense froth which was dewatered and dried in the conventional manner to give a product designated hereinafter as "tailing." The phosphate product or "concentrate" remained in the pulp. Any variations from the above-described standard procedure are indicated in the examples.

EXAMPLE I

The ionization inhibitor employed in this example was calcium sulphate in the form of gypsum ($CaSO_4.2H_2O$) ground to pass 80 mesh. It was mixed with the deslimed pulp, which contained about 60% solids, in the proportion of 5 pounds per ton of solids, and then a water emulsion of the cationic reagent and collector was mixed in. Agitation of the pulp was continued until the dark color of the emulsified oil was no longer apparent. Thereafter the pulp was diluted; the frother was added; and froth was removed in a flotation period enduring for from 1 to 2 minutes.

For purposes of comparison, a "blank" sample was subjected to exactly the same treatment except that no ionization inhibtor was employed. Further data, including the results of the treatment are given in Table 1.

The calcium sulfate employed in the foregoing example is an ionization inhibitor of type IA (ante) in that it tends to react with the cationic reagent to reduce the latter's water-solubility and consequently its ionization. That the inhibitor was effective in improving the selectivity of the process is indicated by the fact that the recovery of phosphate was raised from 61.1% to 73.6%.

EXAMPLES 2, 3, 4, 5

In this series of tests, the efficacy of various ionization inhibitors of type IA was determined.

In Example 2, gypsum was again employed as an inhibitor and was mixed with the pulp prior to the addition of the other reagents.

In Example 3, gypsum was also employed, but was mixed with the emulsion of cationic reagent and collector prior to addition to the pulp.

In Example 4, the inhibitor was sulfuric acid. To 30 cc. of 1% solution of the cationic reagent (equivalent to 0.3 pound of reagent per ton of solids in the pulp) there was added 5 cc. of a 5% $H_2SO_4$ solution. The resulting precipitate was washed to free it of excess acid, and the washed precipitate and the collector were mixed with the pulp.

In Example 5, the ionization inhibitor was potassium sulphate, which was mixed into the pulp prior to the addition of the aqueous emulsion of cationic reagent and collector.

The blank sample was subjected to the same treatment as the others, except that no ionization inhibitor was employed.

The effect of the various inhibitors and of the manner in which they were used is shown in the following table.

Table 1

| | Blank | Example 1 ionization restricted by calcium sulfate |
|---|---|---|
| Desliming | | |
| Attrition time—mins | 16 | 16 |
| Flotation | | |
| Per cent solids in pulp during conditioning | 60 | 60 |
| Ionization inhibitor—kind | None | Gypsum |
| lbs./ton dry feed | | 5.0 |
| Cationic reagent—"Cl-B"—lbs./ton dry feed | 0.2 | 0.2 |
| Collector—Petroleum fuel oil—lbs./ton dry feed | 1.5 | 1.5 |
| Frother—du Pont "B-23"—lbs./ton dry feed | 0.3 | 0.3 |
| Analysis | | |
| Feed: | | |
| Per cent B. P. L.[1] | 32.81 | 32.02 |
| Per cent insol | 58.69 | 59.14 |
| Slime: | | |
| Per cent B. P. L | 57.22 | 57.22 |
| Per cent insol | 24.75 | 24.75 |
| Concentrate: | | |
| Per cent B. P. L | 78.55 | 77.31 |
| Per cent insol | 3.47 | 6.27 |
| Tailing: | | |
| Per cent B. P. L | 12.79 | 6.63 |
| Per cent insol | 83.34 | 89.47 |
| Per cent distribution | | |
| B.P.L.: | | |
| Slime | 12.7 | 13.6 |
| Concentrate | 61.1 | 73.6 |
| Tailing | 26.2 | 12.8 |
| Insol.: | | |
| Slime | 3.1 | 3.2 |
| Concentrate | 1.5 | 3.2 |
| Tailing | 95.4 | 93.6 |

[1] Bone phosphate of lime.

Table 2

| | Blank | Examples No. | | | |
|---|---|---|---|---|---|
| | | 2 | 3 | 4 | 5 |
| Desliming | | | | | |
| Attrition time—minutes | 15 | 15 | 15 | 15 | 15 |
| Flotation | | | | | |
| Percent solids in pulp during conditioning | 50 | 50 | 50 | 50 | 50 |
| Ionization inhibitor—kind | None | $CaSO_4$ | $CaSO_4$ | $H_2SO_4$ (¹) | $K_2SO_4$ |
| lbs./ton | | 5 | 5 | | 1 |
| Cationic reagent—"Cl-B"—lbs./ton | 0.3 | 0.3 | 0.3 | 0.3 | 0.3 |
| Collector—petrol. fuel oil—lbs./ton | 1.5 | 1.5 | 1.5 | 1.5 | 1.5 |
| Frother—du Pont "B-23"—lbs./ton | 0.3 | 0.3 | 0.3 | 0.3 | 0.3 |
| Analysis | | | | | |
| Feed: | | | | | |
| Per cent B. P. L | 29.86 | 30.60 | 29.88 | 30.38 | 31.27 |
| Per cent insol | 62.59 | 61.53 | 62.19 | 61.51 | 61.11 |
| Concentrate: | | | | | |
| Per cent B. P. L | 75.72 | 78.82 | 76.31 | 78.07 | 78.41 |
| Per cent insol | 7.15 | 3.60 | 6.28 | 3.27 | 4.42 |
| Tailing: | | | | | |
| Per cent B. P. L | 12.58 | 9.37 | 5.22 | 9.94 | 9.22 |
| Per cent insol | 83.54 | 87.06 | 92.55 | 86.51 | 87.58 |
| Percent distribution | | | | | |
| B. P. L.: | | | | | |
| Concentrate | 69.4 | 78.8 | 88.7 | 77.2 | 80.0 |
| Tailing | 30.6 | 21.2 | 11.3 | 22.8 | 20.0 |
| Insol.: | | | | | |
| Concentrate | 3.1 | 1.8 | 3.6 | 1.6 | 2.3 |
| Tailing | 96.9 | 98.2 | 96.4 | 98.4 | 97.7 |

In another test, lead sulphate in the proportion of 5 pounds per ton of solids was incorporated in the pulp, but was found to be substantially ineffective as an ionization inhibitor, probably because its water-solubility is too low—i. e., substantially less than that of calcium sulphate—and hence yields an ineffective quantity of $SO_4$ ions to react with the cationic reagent.

It is to be observed that all of the compounds yielding substantial proportions of $SO_4$ ions are effective in raising the selectivity of the flotation process, and that such compounds with relatively low water-solubility (for example, calcium sulphate) are particularly effective if they are mixed with the cationic reagent in relatively concentrated condition, prior to dilution with the pulp.

It is also to be observed that the effect of the sulfuric acid is not to be attributed to a change in the hydrogen ion concentration in the pulp, for the acid in excess of that required to react with the cationic reagent was not permitted to enter the pulp.

EXAMPLE 6

This example illustrates the effect of $-S_2O_3$ ion in inhibiting the ionization of cationic reagents. The sodium thiosulfate employed is an inhibitor of type IC and was added to the de-slimed pulp during the conditioning step. Other pertinent data of the test are given in Table 3, which also shows the results obtained in a blank test, identical in all respects to that of Example 6 except that no ionization inhibitor was employed.

Table 3

|  | Blank | Example 6 |
|---|---|---|
| *Desliming* |  |  |
| Attrition time—minutes | 15 | 15 |
| *Flotation* |  |  |
| Percent solids in pulp during conditioning | 50 | 70 |
| Ionization inhibitor—kind | None | $Na_2SO_3$ |
| lb./ton |  | 2 |
| Cationic reagent—"Cl-B"—lb./ton | 0.3 | 0.3 |
| Collector—petrol. fuel oil—lb./ton | 1.5 | 1.5 |
| Frother—du Pont "B-23"—lb./ton | 0.3 | 0.3 |
| *Analysis* |  |  |
| Feed: |  |  |
| Percent B. P. L | 29.86 | 31.17 |
| Percent insol | 62.59 | 60.71 |
| Concentrate: |  |  |
| Percent B. P. L | 75.72 | 75.96 |
| Percent insol | 7.15 | 7.01 |
| Tailing: |  |  |
| Percent B. P. L | 12.58 | 6.55 |
| Percent insol | 83.54 | 90.33 |
| *Percent distribution* |  |  |
| B. P. L.: |  |  |
| Concentrate | 69.4 | 86.5 |
| Tailing | 30.6 | 13.5 |
| Insol.: |  |  |
| Concentrate | 3.1 | 4.1 |
| Tailing | 96.9 | 95.9 |

As the table shows, the $-S_2O_3$ ion has a marked beneficial effect upon the selectivity of the process.

EXAMPLE 7

This example demonstrates the effect of ionization inhibitors of type IB—organic sulfonates. The particular organic sulfonate employed is a commercial product sold under the name "Daxad No. 23" by the Dewey and Almy Chemical Company, and is a mixture of "polymerized salts of sulfonic acid of the alkyl-acyl type." When a water solution of this reagent is mixed with a water solution of the cationic reagent "Cl—B," a yellowish precipitate is formed.

In Example 7 and in the blank test run for comparative purposes, the pulp was washed thoroughly after a 10-minute attrition treatment, but a 5% aqueous suspension of slime was added to the resulting de-slimed feed, so as to give 1.5 pounds of slime per ton of other solids present in the pulp. In this way it was possible to demonstrate that the ionization inhibitors have a beneficial effect upon the selectivity of the process even when substantial slimes are present.

In Example 7, the organic sulfonate "Daxad No. 23" in the proportion of .25 pound per ton of solids was mixed with the slime-bearing pulp immediately before the emulsion of cationic reagent and collector was incorporated. The blank received identical treatment except that no ionization inhibitor was employed. The results of the comparative tests are given in Table 4.

Table 4

|  | Blank | Example 7 |
|---|---|---|
| *Desliming* [1] |  |  |
| Attrition time—minutes | 10 | 10 |
| *Flotation* |  |  |
| Percent solids in pulp during conditioning | 50 | 50 |
| Ionization inhibitor—kind | None | Daxad #23 |
| lb./ton |  | .25 |
| Cationic Reagent "Cl-B"—lb./ton | .35 | .3 |
| Collector—petrol. fuel oil—lb./ton | 1.5 | 1.5 |
| Frother—du Point "B-23"—lb./ton | 0.3 | .3 |
| *Analysis* |  |  |
| Feed: |  |  |
| Per cent B. p. l | 28.36 | 30.84 |
| Per cent insol | 63.94 | 61.99 |
| Concentrate: |  |  |
| Per cent B. p. l | 62.65 | 76.69 |
| Per cent insol | 23.27 | 6.94 |
| Tailing: |  |  |
| Per cent B. p. l | 6.99 | 6.77 |
| Per cent insol | 89.32 | 90.93 |
| *Percent distribution* |  |  |
| B. P. L.: |  |  |
| Concentrate | 84.8 | 85.6 |
| Tailing | 15.2 | 14.4 |
| Insol.: |  |  |
| Concentrate | 14.0 | 3.6 |
| Tailing | 86.0 | 96.4 |

[1] 1.5 lb./slime per ton returned to de-slimed feed.

The beneficial result of the extremely small proportion of ionization inhibitor employed in Example 7 is shown by the high grade of the concentrate which was produced despite the presence of a relatively large proportion of slime. Thus, the concentrate grade was raised from 62.65% to 76.69% bone phosphate of lime (B. P. L.).

EXAMPLE 8

The use of a reagent of type II—A, specifically cupro-ammonium nitrate, is illustrated by this example.

The sample and the blank treated for purposes of comparison were subjected to attrition treatment for 6½ minutes and then washed. This removed some of the slimable material from the pulp, but in order to test the effect of free slime, 2 pounds (dry) of slime per ton of solids were returned to the pulp samples prior to conditioning.

The cupro-ammonium nitrate (equivalent to .12 pound Cu per ton solids in the pulp) was mixed with the pulp prior to conditioning with the emulsion of collector and cationic reagent. The results of the tests are shown in Table 5.

Table 5

| | Blank | Example 8 |
|---|---|---|
| *Desliming* [1] | | |
| Attrition time—minutes | 6½ | 6½ |
| *Flotation* | | |
| Percent solids in pulp during conditioning | 50 | 50 |
| Ionization inhibitor—kind | None | Cupro-ammonium nitrate |
| lb./ton | | .12 Cu. |
| Cationic reagent—"Cl-B"—lb./ton | .25 | .25 |
| Collector—petrol. fuel oil—lb./ton | 1.0 | 1.0 |
| Frother—du Pont "B-23"—lb./ton | .25 | .25 |
| *Analysis* | | |
| Feed: | | |
| Per cent B. P. L | 29.94 | 30.49 |
| Per cent insol | 62.56 | 62.24 |
| Concentrate: | | |
| Per cent B. P. L | 43.40 | 52.93 |
| Per cent insol | 47.40 | 35.40 |
| Tailing: | | |
| Per cent B. P. L | 2.74 | 5.18 |
| Per cent insol | 94.24 | 92.55 |
| *Per cent distribution* | | |
| B. P. L.: | | |
| Concentrate | 97.0 | 91.8 |
| Tailing | 3.0 | 8.2 |
| Insol.: | | |
| Concentrate | 50.3 | 30.2 |
| Tailing | 49.7 | 69.8 |

[1] 2 lb./slime per ton returned to de-slimed feed.

The principal beneficial effect of the ionization inhibitor was to raise the grade of the concentrate (from 43.40% to 52.93%) while increasing the proportion of the total insoluble matter collected in the tailing (from 49.7% to 69.8%). Further benefits from the use of cupro-ammonium nitrate and similar inhibitors can be obtained by carrying out the flotation in the presence of less slime or "slimables" or by employing a greater proportion of inhibitor.

EXAMPLES 9, 10

The feed employed in these examples and in the comparative "blank" had been largely cleaned with respect to free slime in a large Denver conditioner, but received no further attrition or water washing. Hence, free slime was largely removed but much "slimables" or potential slime was retained.

The ionization inhibitors employed were of type II—B, i. e., water-soluble non-electrolytes, specifically dextrine and sugar. In each case the inhibitor was mixed with the water emulsion of the collector and the cationic reagent prior to incorporation of the pulp. That both reagents were effective in improving the selectivity of the process is shown in the following table.

Table 6

| | Blank | Examples | |
|---|---|---|---|
| | | 9 | 10 |
| *Desliming* | | | |
| Attrition time—minutes | None | None | None |
| *Flotation* | | | |
| Per cent solids in pulp during conditioning | 50 | 50 | 50 |
| Ionization inhibitor—kind | None | Dextrine | Sugar |
| lb./ton | | 1.0 | 1.0 |
| Cationic reagent "Cl-B"—lb./ton | 0.3 | 0.3 | 0.3 |
| Collector—petrol fuel oil—lb./ton | 3.0 | 3.0 | 3.0 |
| Frother—du Pont "B-23"—lb./ton | 0.3 | 0.3 | 0.3 |
| *Analysis* | | | |
| Feed: | | | |
| Per cent B. P. L | 27.64 | 27.69 | 27.97 |
| Per cent insol | 64.61 | 64.62 | 63.91 |
| Concentrate: | | | |
| Per cent B. P. L | 77.15 | 76.87 | 75.79 |
| Per cent insol | 5.13 | 5.17 | 7.09 |
| Tailing: | | | |
| Per cent B. P. L | 19.73 | 12.51 | 12.88 |
| Per cent insol | 74.13 | 83.08 | 81.93 |
| *Per cent distribution* | | | |
| B. P. L.: | | | |
| Concentrate | 38.5 | 65.5 | 65.1 |
| Tailing | 61.5 | 34.5 | 34.9 |
| Insol.: | | | |
| Concentrate | 1.1 | 1.9 | 2.7 |
| Tailing | 98.9 | 98.1 | 97.3 |

As indicated above, both dextrine and the sugar were responsible for a great increase in the proportion of phosphate recovered in the concentrate and substantially overcame the deleterious effect of the "slimable" material in the feed.

I claim:

1. The method of beneficiating a phosphate ore by flotation of a silica-containing concentrate therefrom which comprises subjecting phosphate rock to a desliming operation to separate slime, forming a pulp comprising the deslimed phosphate rock, an amino compound which in aqueous solution yields large positive lipophile ions and mildly negative hydrophile ions and an amount of an alkaline earth sulphate sufficient to inhibit ionization of the amino compound, and subjecting the resultant pulp to froth flotation.

2. The method of beneficiating a phosphate ore as set forth in claim 1, in which the ionization inhibitor is calcium sulphate.

3. The method of beneficiating a phosphate ore as set forth in claim 1, in which the ionization inhibitor is calcium sulphate and is added to the pulp in an amount equal to about 5 pounds per ton of solid material in the pulp.

EDWARD J. ELLIS.

CERTIFICATE OF CORRECTION.

Patent No. 2,327,408.   August 24, 1943.

EDWARD J. ELLIS.

It is hereby certified that error appears in the printed specification of the above numbered patent requiring correction as follows: Page 2, second column, line 5, for "ionization" read --ionizing--; line 27, for "fluospar" read --fluorspar--; page 4, first column, line 42, Table 3, for "Na$_2$SO$_3$" read --Na$_2$S$_2$O$_3$--; page 5, first column, line 19, Table 5, for "Railing" read --Tailing--; and second column, line 31, before "dextrine" insert --the--; and that the said Letters Patent should be read with this correction therein that the same may conform to the record of the case in the Patent Office.

Signed and sealed this 9th day of November, A. D. 1943.

Henry Van Arsdale,
(Seal) Acting Commissioner of Patents.